Aug. 5, 1958     N. W. DENSMORE     2,846,093
TRANSFER MECHANISM FOR AUGER DRILLS

Filed Sept. 7, 1955     2 Sheets-Sheet 1

INVENTOR:
NEAL W. DENSMORE
BY Charles F. Osgood,
ATTORNEY

Aug. 5, 1958

N. W. DENSMORE 2,846,093

TRANSFER MECHANISM FOR AUGER DRILLS

Filed Sept. 7, 1955

INVENTOR:
NEAL W. DENSMORE

BY
Charles F Osgood,

ATTORNEY

2,846,093

Patented Aug. 5, 1958

2,846,093
TRANSFER MECHANISM FOR AUGER DRILLS

Neal W. Densmore, Franklin, Pa., assignor to Joy Manufacturing Company, Pittsburgh, Pa., a corporation of Pennsylvania Application September 7, 1955, Serial No. 532,841

11 Claims. (Cl. 214—130)

This invention relates to auger boring machines for mining coal and more particularly to a transfer mechanism for moving auger sections from a place of storage in an underground mine to a position in alignment with the chuck of the boring machine.

In auger boring machines for mining coal, especially in underground mines, a series of relatively deep parallel horizontal holes are drilled in the coal seam and when the drilling of one hole is completed the boring machine is moved over the mine floor to a next adjacent position for drilling an adjacent parallel hole. The auger drill string is detached from the chuck of the boring machine prior to the shifting of the machine to its new drilling position and the sections of the auger drill string are stored in the completed hole until needed for use in the drilling of the next adjacent hole, and the auger sections may be transferred a section at a time for connection to the drill string during drilling of the adjacent hole. It has become customary practice to roll the heavy auger sections over the rough bottom or floor of the mine and to lift manually and rotate the auger sections to bring them in proper alignment with the drill chuck to enable attachment thereof to the drill string as the adjacent hole deepens. The present invention contemplates improvements over known types of auger boring machines in that an improved mechanism is provided for transferring the auger sections from the storage-hole laterally and for elevating and positioning the auger sections with respect to the chuck of the machine to enable attachment thereof to the drill string, thereby eliminating the laborious task of manually transferring, elevating and positioning the auger sections; a task which is unusually difficult in the relatively restricted spaces encountered in underground coal mines.

An object of the present invention is to provide an improved transfer mechanism for the auger drill sections of the drill string of an auger boring machine. Another object is to provide an improved mechanism for transferring auger sections from a place of storage to their place of use, and for elevating and positioning the auger sections with respect to the chuck of the boring machine with which the transfer mechanism is associated. Yet another object is to provide an improved elevating mechanism for auger drill sections; the elevating mechanism movable along a trackway laid on the mine floor between the boring machine and the working face of the coal seam and having improved means for elevating and positioning the auger section carried by the load or work support of the elevating mechanism. These and other objects and advantages will, however, hereinafter more fully appear as the description proceeds.

In the accompanying drawings there is shown for purposes of illustration one form which the invention may assume in practice.

Figure 1:
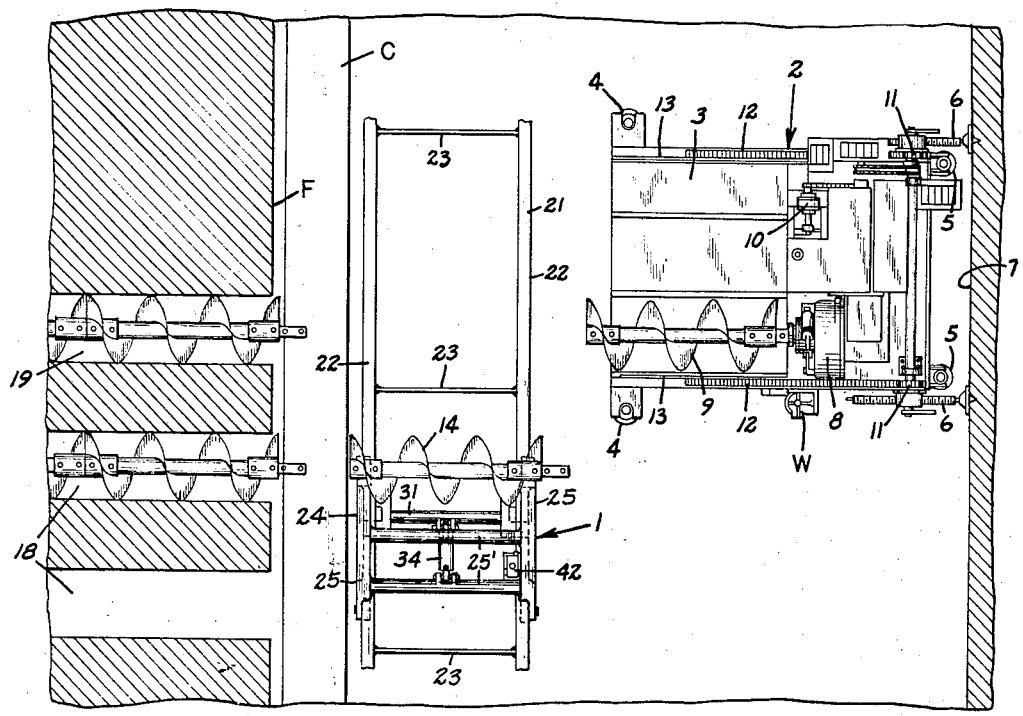
Fig. 1 is a somewhat diagrammatic plan view showing the improved transfer mechanism in association with an auger boring machine, illustrating the same during the drilling of a series of parallel horizontal holes in the coal seam of an underground coal mine.

In this illustrative embodiment of the invention, as shown in the drawings, the improved transfer mechanism is generally designated 1 and is shown associated with an auger boring machine, generally designated 2, of the type commonly used in the drilling of parallel horizontal holes in the coal seam of an underground mine. Evidently the transfer mechanism may be associated with other types of machines used for other purposes.

Figure 2:
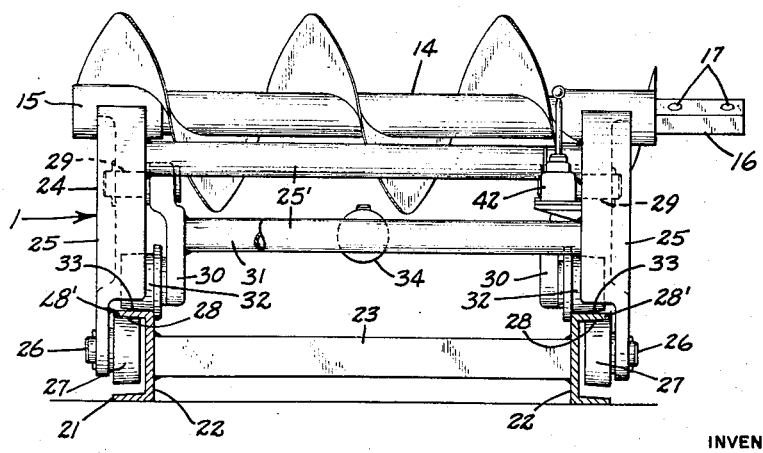
Fig. 2 is a side elevational view of the improved transfer mechanism with an auger drill section shown in position thereon, the view taken on line 2—2 of Fig. 4.
Figure 3:
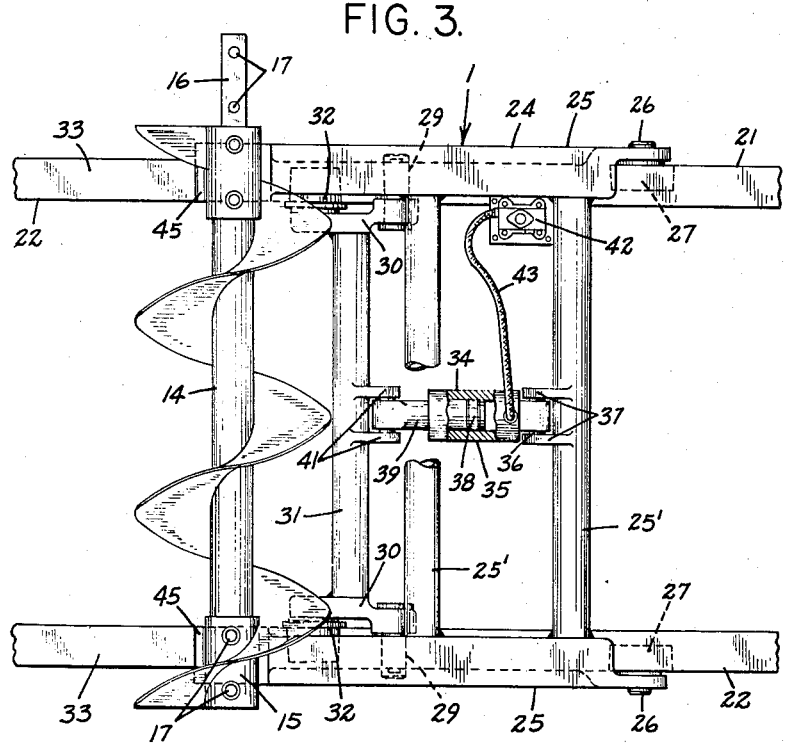
Fig. 3 is a plan view of the transfer mechanism shown in Fig. 2, with a portion broken away in horizontal section.
Figure 4:
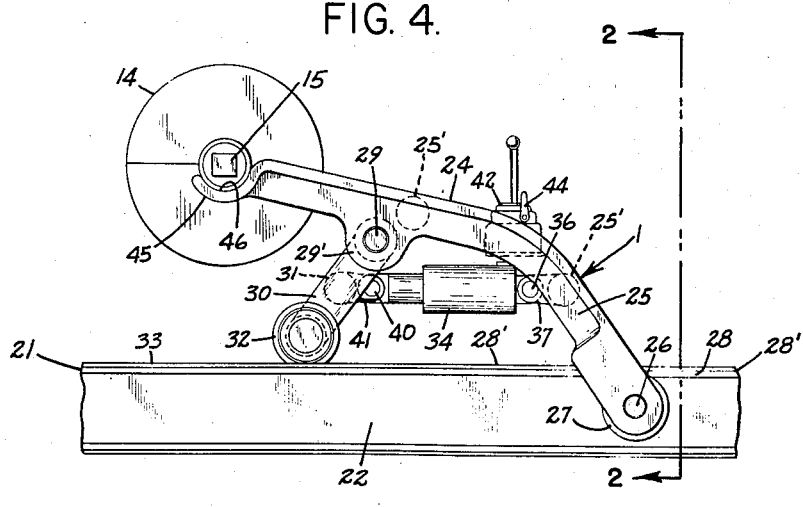
Fig. 4 is an end elevational view of the transfer mechanism shown in Figs. 2 and 3.

The auger boring machine may assume any suitable form and is herein desirably, for illustrative purposes, shown to be similar to that disclosed in the Goodrich and Hale application Serial No. 96,387, filed May 24, 1949, now Patent No. 2,726,064, issued December 6, 1955, owned by the same assignee as the present invention. This boring machine generally comprises a frame 3 mounted on conventional upright elevating jacks 4 and 5 and having a pair of horizontal jack devices 6 engageable with a mine wall 7. Carried by the frame 3 is a motor driven rotating mechanism 8 for an auger drill string 9 to which a conventional auger boring head is attached. The jack devices 4 and 5 are desirably of the hydraulic cylinder and piston type and a motor driven pump 10 on the machine frame serves to supply liquid under pressure to the jack cylinders. Motor driven pinions 11 engage parallel racks 12 on the machine frame for moving the drill rotating mechanism 8 longitudinally along guideways 13 on the machine frame for moving the drill rotating mechanism toward and from the working face F of the coal seam. The auger drill string 9 is herein composed of relatively short auger sections 14, one of which is shown in Figs. 2, 3 and 4 and, as disclosed in the copending application above referred to, these auger sections have socketed portions 15 at one end and rectangular shank portions 16 at the other end and the portion 15 is adapted to receive the shank of an adjacent aligned section while the shank 16 is received in the socketed portion of the other adjacent aligned section. The shanks 16 may be secured in the sockets by suitable releasable devices 17 such as clip-like elements receivable in suitable apertures.

As shown in Fig. 1, the transfer mechanism 1 is arranged longitudinally in parallelism with the working face F, and extending lengthwise of the face between the transfer mechanism and the face is a conventional face conveyor C which receives the coal-borings or cuttings removed from the coal seam during the boring operation and conveys the loose coal received thereby away from the face in a well-known manner. In Fig. 1 the completed drill holes are designated 18 and the adjacent hole being drilled is designated 19, and the auger drill string is shown with sections thereof stored in an adjacent completed hole. In Fig. 1 the auger drill string is shown with its sections uncoupled and moved apart to enable attachment of an additional auger section to increase the length of the string as the hole deepens.

Now referring to the improved transfer mechanism, it will be noted that lying on the mine floor in parallelism with the working face between the face conveyor and the boring machine is a trackway 21 composed of parallel channel iron sections 22 rigidly held in spaced parallel relation by transverse members 23 suitably secured as by welding to the channel iron sections. Mounted on this trackway is a mobile adjustable frame 24 having leverlike side portions 25 rigidly secured together by transverse members 25', herein desirably of tubular form, secured as by welding to the side members 25. Journaled on stub shafts 26 carried at the lower ends of the side portions 25 of the transfer frame are guides such as small wheels or rollers 27 which underlie and bear against the downwardly facing guiding or track surfaces 28 of the top flanges 28' of the channel irons 22. Pivotally engaging pivot pins 29 carried by depending lugs or bosses 29' integral with the side frame portions 25 is a roller supporting frame having leverlike side portions or arms 30 rigidly secured together as by a transverse tubular portion 31. Journaled on the lower portions of the swingable leverlike frame portions are guides such as small wheels or rollers 32 which travel along the upper guiding or track surfaces 33 of the channel irons. Thus the relatively swingable leverlike frame portions of the transfer mechanism are adapted to roll along the upper flanges of the channel irons of the trackway.

Extending longitudinally between the outermost transverse member 25' and the tubular transverse member 31 is an extensible jack device 34 comprising a cylinder 35 pivotally connected at 36 to lugs 37 integral with the outermost transverse member 25' and reciprocable in this cylinder is a piston 38 having its piston rod 39 pivotally connected at 40 to lugs 41 integral with the transverse member 31. A conventional hand pump 42 carried by the frame of the transfer mechanism is adapted to supply liquid under pressure through a conduit 43 to the jack cylinder 35 and suitable valve means 44 (Fig. 4) may be provided for trapping liquid within the jack cylinder or venting liquid from the jack cylinder in a well-known manner. Thus by suitably operating the hydraulic jack the relatively swingable leverlike portions of the transfer frame may be swung in vertical planes about their pivots to effect raising and lowering of work supports 45 by which an auger section may be carried. These work supports are formed at the upper portions of the leverlike side frames 25 and provide curved recesses or seats 46 in which the cylindrical end portions of a section are adapted to rest as shown in Fig. 4.

The general mode of use of the improved transfer mechanism is as follows: Upon completion of a hole in the coil seam, the drill string may be detached from the chuck of the boring machine and the auger sections may be stored within the completed drill hole until they are needed. The auger drill head is then attached to the single auger section on the boring machine and the hole 19 is started and when the auger head has drilled into the coal to a depth equal to the length of the feed of the boring machine, it may be detached from the auger section and the machine feed may be retracted to the position shown in Fig. 1, leaving a space between the boring head and the auger section as shown. An auger section may then be released from the auger string stored within the completed drill hole and the cable of a winch W on the machine may be attached to the auger section to bring the latter into a position to be received by the work or load supports 45 of the transfer mechanism. The auger section being transferred may be moved above the face conveyor and the trackway 21 and supported in position to be received by the transfer mechanism in any suitable manner, either manually or by a power mechanism. The wheeled frame of the transfer mechanism may then be moved either manually, or by the winch of the machine, horizontally along the trackway 21 to bring the auger section into substantial alignment with the boring head and the auger section on the machine and the hydraulic jack 34 may then be operated to raise and lower the work supports of the elevating mechanism to bring the socketed portion and shank of the auger section into exact alignment with the socketed portion and shank of the auger section on the machine and the boring head and the parts may then be rigidly locked together by the connecting devices 17. The drill string may then be again advanced by the feeding mechanism of the boring machine and, as the hole deepens, additional auger sections may be removed from the storagehole and transferred to positions for attachment to the drill string of the machine. When not in use, the elevating mechanism of the transfer frame may be moved to an out-of-the-way position at one end of the guideway.

As a result of this invention, an improved adjustable transfer mechanism is provided for transferring auger drill sections from a place of storage to a place of use. By the provision of the elevating mechanism mounted to roll along a horizontal trackway arranged between the boring machine and the working face of the coal seam it is possible readily to transfer the auger sections from one place to the other and to elevate the auger sections to the proper heights with a minimum of effort. The improved transfer mechanism is not only relatively simple and compact in design but is also relatively rugged and has ease of operation thereby being well adapted for its intended purpose. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a transfer mechanism for auger drill sections, a horizontal trackway comprising parallel track rails laid on the floor, a roller mounted frame adapted to travel back and forth along said trackway and having side rollers engaging said track rails, spaced adjustable load supports carried by said frame, one above each track rail, for receiving an auger section, and means operatively associated with said frame at the sides thereof and including additional side rollers engaging said track rails and adjustable relative to said first mentioned side rollers for adjusting concurrently the elevation of said load supports.

2. In a transfer mechanism for auger drill sections, a horizontal trackway comprising parallel track rails laid on the floor, a roller mounted frame adapted to travel back and forth along said trackway and having side rollers engaging said track rails, spaced adjustable load supports carried by said frame, one above each track rail, for receiving an auger section, said roller mounted frame having relatively swingable leverlike portions at the sides thereof each carrying a track engaging roller, and means operatively associated with said frame at the sides thereof for adjusting concurrently the elevation of said load supports, said adjusting means having adjusting elements operatively connected between said leverlike portions for relatively swinging the latter simultaneously to vary the elevation of said load supports.

3. A transfer mechanism as set forth in claim 2 wherein a load support is connected to each one of said leverlike portions at the end thereof remote from its end which carries its track engaging roller.

4. In a transfer mechanism for auger drill sections, a horizontal trackway comprising parallel track rails laid on the floor, and supporting and elevating mechanisms guided for movement along said trackway comprising spaced leverlike side frame portions rigidly connected together and carrying track engaging elements at one end and spaced load supports at their other ends for receiving an auger section, leverlike frame portions pivotally connected to said side frame portions intermediate its ends and carrying track engaging elements in the planes of said track rails, and adjusting means operatively connected between said side frame portions and said leverlike frame portions for simultaneously relatively swinging the same to vary the elevation of said load supports.

5. In a transfer mechanism for auger drill sections, a horizontal trackway laid on the floor, and supporting and elevating mechanism guided for movement along said trackway comprising spaced leverlike side frame portions rigidly connected together and carrying track engaging elements at one end and load supports at their other ends for receiving an auger section, leverlike frame portions pivotally connected to said side frame portions intermediate its ends and carrying track engaging elements, and adjusting means operatively connected between said side frame portions and said leverlike frame portions for relatively swinging the same to vary the elevation of said load supports, said trackway having spaced channel iron side frames and said track engaging elements respectively engaging the upper and lower surfaces of the upper flanges of the channel irons.

6. A transfer mechanism as set forth in claim 5 wherein said adjusting means comprises an extensible power device and one of said leverlike frame portions carries a power generator from which power medium may be supplied to said power device for extending the latter.

7. A transfer mechanism as set forth in claim 5 wherein said track engaging elements are in the form of rollers.

8. A transfer mechanism for auger drill sections comprising a trackway comprising parallel track rails laid on the floor, a transfer frame comprising pairs of relatively swingable pivotally connected frame portions at the sides of the mechanism carrying track rail engaging elements and adapted to travel along said trackway, one of the frame portions of each pair having an upper load support for receiving an auger section, and means operatively connected between said frame portions for relatively swinging the same simultaneously to vary the elevation of the load supports.

9. A transfer mechanism for auger drill sections comprising a trackway laid on the floor, a transfer frame comprising relatively swingable pivotally connected frame portions carrying track engaging elements and adapted to travel along said trackway, one of said frame portions having an upper load support for receiving an auger section, and means operatively connected between said frame portions for relatively swinging the same to vary the elevation of the load support, said trackway comprising parallel flanged track members and said track engaging elements respectively engaging the upper and lower surfaces of the flanges.

10. In a work transfer mechanism, the combination comprising a guiding track providing upper and lower trackways, a transfer frame comprising relatively swingable pivotally connected frame portions mounted to swing in vertical planes and said frame portions respectively carrying trackway engaging elements and adapted to travel along said guiding track, one of said frame portions having an upper load support for receiving the work to be transferred, and means operatively connected between said frame portions for relatively swinging the same in vertical planes for relatively moving said trackway engaging elements to vary the elevation of said work support, said trackway engaging elements respectively engaging said upper and lower trackways of said guiding track.

11. A combination as set forth in claim 10 wherein said relatively swingable frame portions each carry a roller whch engage said trackways, one roller riding along the top of said guiding track along the upper trackway and the other roller lying beneath and rolling along the lower trackway, relative swinging movement of said frame portions effecting relative bodily movement of said rollers.

References Cited in the file of this patent

UNITED STATES PATENTS

| 1,848,898 | McFarland | Mar. 8, 1932 |
| 2,687,873 | Trautman et al. | Aug. 31, 1954 |

FOREIGN PATENTS

| 263,790 | Great Britain | July 28, 1927 |